US009655347B2

(12) United States Patent
Troy et al.

(10) Patent No.: US 9,655,347 B2
(45) Date of Patent: *May 23, 2017

(54) AUTOMATED OPEN OCEAN FISH FARM STRUCTURES AND SYSTEMS FOR OPEN OCEAN FISH FARMING

(75) Inventors: Paul James Troy, Captain Cook, HI (US); William Albert Spencer, Honolulu, HI (US)

(73) Assignee: William A Spencer, Jr., Honolulu, HI (US), Trustee, William A. Spencer, Jr. Limited Trust DTD Nov. 2, 2007

( * ) Notice: Subject to any disclaimer, the term of this patent is extended or adjusted under 35 U.S.C. 154(b) by 1165 days.

This patent is subject to a terminal disclaimer.

(21) Appl. No.: 13/221,875

(22) Filed: Aug. 30, 2011
(Under 37 CFR 1.47)

(65) Prior Publication Data
US 2012/0006277 A1    Jan. 12, 2012

Related U.S. Application Data

(63) Continuation-in-part of application No. 11/849,338, filed on Sep. 3, 2007, now Pat. No. 8,028,660.
(Continued)

(51) Int. Cl.
*A01K 61/60*    (2017.01)
*A01K 61/65*    (2017.01)
*A01K 61/00*    (2017.01)

(52) U.S. Cl.
CPC .............. *A01K 61/60* (2017.01); *A01K 61/65* (2017.01); *A01K 61/00* (2013.01)

(58) Field of Classification Search
CPC ...... A01K 61/00; A01K 61/002; A01K 63/04; A01K 63/00; A01K 71/00; A01K 73/025;
(Continued)

(56) References Cited

U.S. PATENT DOCUMENTS

| 2,006,985 A | 7/1935 | Claude et al. |
| 3,805,515 A | 4/1974 | Zener |

(Continued)

FOREIGN PATENT DOCUMENTS

| JP | 2002106792 A | 4/2002 |
| JP | 200376885 A | 3/2003 |

(Continued)

OTHER PUBLICATIONS

Ouchi, Kazuyuki, Otsuka, Koji, and Hisaaki Omura. "Recent Advances of Ocean Nutrient Enhancer "TAKUMI" Project." The Proceedings of the Sixth (2005) ISOPE Ocean Mining Symposium Changsha, Hunan, China, Oct. 9-13, 2005. By Kazuyuki Ouchi. [S.I.]: International Society of Offshore and Polar Engineers, 2005. Print.

*Primary Examiner* — Joshua Huson
(74) *Attorney, Agent, or Firm* — Seth M. Reiss (57) ABSTRACT

An autonomous open-ocean fish-farming structure has a submersible cage enclosure tethered to a topside buoy. The topside buoy stores feed, is equipped with radio telemetry to communicate positioning signals transmitted from external sources, and generates electrical power using, for example, a hybrid solar OTEC heat engine. The structure is navigated and maintained in a geostationary position within the ocean environment by means of position-correction technology and is propelled by thrusters attached to the cage enclosure and, optionally, to the underside of the topside buoy. The self-positioning, self-powered fish-farming structure enables unmanned, extended marine deployment in deeper ocean waters without the need for tethering or anchoring to the ocean floor. Multiple structures can be maintained in a spaced apart configuration to comprise a flotilla of fish farming structures attended by a tender ship that is autonomous, easily serviced and conveniently relocated.

8 Claims, 9 Drawing Sheets

Related U.S. Application Data (60) Provisional application No. 60/850,855, filed on Oct. 10, 2006.

(58) Field of Classification Search
CPC .. A01K 99/00; A01K 2227/40; A01K 61/007; A01K 61/65; A01K 61/54; A01K 61/60; A01K 63/10
USPC ......... 119/223, 215, 207, 208, 211; 114/264, 114/266, 267
See application file for complete search history.

(56) References Cited

U.S. PATENT DOCUMENTS

| | | | |
|---|---|---|---|
| 3,860,900 A | | 1/1975 | Scudder |
| 3,883,913 A | | 5/1975 | Givens |
| 4,086,717 A | * | 5/1978 | Aucoin et al. ................... 43/6.5 |
| 4,224,891 A | | 9/1980 | Rinaldi |
| 4,302,297 A | | 11/1981 | Humiston |
| 4,312,296 A | | 1/1982 | Stelleman et al. |
| 4,334,873 A | | 6/1982 | Connell |
| 4,355,513 A | | 10/1982 | Girden |
| 4,441,321 A | | 4/1984 | Ridgway |
| 4,726,191 A | | 2/1988 | Kawamura |
| 4,744,331 A | | 5/1988 | Whiffin |
| 4,936,253 A | | 6/1990 | Ostamendi-Busto |
| 5,617,813 A | | 4/1997 | Loverich et al. |
| 5,713,303 A | * | 2/1998 | Willinsky et al. ............ 119/218 |
| 5,894,450 A | * | 4/1999 | Schmidt et al. ............... 367/134 |
| 6,044,798 A | | 4/2000 | Foster et al. |
| 6,100,600 A | | 8/2000 | Pflanz |
| 6,202,417 B1 | | 3/2001 | Beck |
| 6,520,115 B2 | | 2/2003 | Boyd |
| 6,550,248 B1 | | 4/2003 | Sangster et al. |
| 6,568,169 B2 | | 5/2003 | Conde et al. |
| 7,178,337 B2 | | 2/2007 | Pflanz |
| 7,743,733 B2 | | 6/2010 | Harrison et al. |
| 8,028,660 B2 | * | 10/2011 | Troy .............................. 119/223 |
| 2006/0096548 A1 | * | 5/2006 | Ytterland et al. ............ 119/223 |
| 2009/0235870 A1 | | 9/2009 | Troy |
| 2011/0174232 A1 | | 7/2011 | Hoie |

FOREIGN PATENT DOCUMENTS

| | | | | |
|---|---|---|---|---|
| JP | | 2003081188 A | 3/2003 | |
| JP | | 2003081188 A | 3/2003 | |
| JP | | 2005143403 A | 6/2005 | |
| WO | | 01/52638 A1 | 7/2001 | |
| WO | | WO2004/073396 A1 | 9/2004 | |
| WO | | WO 2005117573 A1 | * 12/2005 | ............ A01K 61/02 |
| WO | | 2006/050386 A2 | 5/2006 | |
| WO | | 2006/050386 A3 | 5/2006 | |

* cited by examiner

AUTOMATED OPEN OCEAN FISH FARM STRUCTURES AND SYSTEMS FOR OPEN OCEAN FISH FARMING

CROSS-REFERENCE

This U.S. Patent Application is a continuation-in-part of application Ser. No. 11/849,338 entitled "Automated Positioning and Submersible Open Ocean Platform" filed Sep. 3, 2007, now U.S. Pat. No. 8,028,660, claiming the benefit of U.S. Provisional Patent Application 60/850,855 filed on Oct. 10, 2006. Both applications are incorporated in their entireties here by this reference.

BACKGROUND OF INVENTION

Technical Field

The invention relates to the field of open ocean structures and fish farming, and in particular, to automated positioning and submersible open ocean structures suitable for growing and harvesting fish and systems employing such structures for open ocean fish farming.

Background Art

Prior attempts have been made to develop aquaculture systems for growing and harvesting fish by mooring or tethering cage structures to shore piers or by anchoring them to the sea floor. Floating aquaculture apparatus moored by anchors and submerged in natural bodies of water, and artificial island reef platforms for raising quantities of pelagic fish with design features that include a subsurface framework, cabling network, multiple cages and stable anchoring systems, are known in the art.

One such structure for near-shore-deployed ocean fish farming comprises a sea cage having a central stem with an air chamber for controlling buoyancy for surfacing or submerging. The bottom of the central stem is tethered to an anchor (or anchors) or grid mooring system on the sea floor. The outer periphery of the cage has mesh netting forming the outer boundaries for the cage. Even when deployed in ocean waters, wastes from the growing fish can become concentrated in the cage volume and the mesh netting may become contaminated and not able to be cleaned efficiently at sea.

BRIEF SUMMARY OF INVENTION

According to the present invention, a submersible structure for fish farming to be maintained in an approximate geostationary position in the ocean comprises:

(a) a submersible cage enclosure for use in the open ocean submerged below the ocean surface for growing an ocean resource within a cage volume contained therein;

(b) a buoyancy control means coupled to the cage structure for raising and lowering the cage structure relative to the ocean surface;

(c) a signal-receiving apparatus coupled to the cage structure for receiving an ocean-positioning signal transmitted from an external source;

(d) a geostationary-position-correction apparatus for providing a geostationary-error signal for the cage structure in the ocean based on the ocean-positioning signal received by the signal-receiving apparatus; and (e) a propulsion system coupled to the cage structure for generating and directing a corrective propulsion force commensurate with the geostationary-error signal provided from the geostationary-position-correction apparatus so as to maintain the cage structure in approximate correspondence with a target geostationary position.

The automated positioning and submersible open-ocean structure enables extended marine deployment in the ocean such as for ocean fish growing and harvesting operations in, for example, a leased open-ocean aquaculture zone. A system comprising plurality of submersible self-positioning structures can be operated and maintained in a fleet or flotilla pattern in a leased zone of the ocean. The automated self-positioning function eliminates the need to anchor the cage enclosures to the ocean floor or to moor them to anchored buoys, thereby allowing large-scale fish growing operations in greater ocean depths, such as within the 200 nautical mile exclusive economic zone of a country or sovereign jurisdiction under international legal protocols.

According to one preferred embodiment, the signal-receiving apparatus and the geostationary-position-correcting apparatus are located on or within the cage enclosure. In an alternative preferred embodiment, the signal-receiving apparatus and the geostationary-position-correcting apparatus are located on a topside buoy to which the cage enclosure is tethered. The topside buoy may also store fish feed and fuel and have power generating means as, for example, from a solar powered hybrid OTEC heat engine cooled with surface water. The topside buoy may optionally have an auxiliary propulsion means.

According to this embodiment, processed fish feed, compressed air and power is fed from the topside buoy to the below surface cage enclosure through conduits integrated with the tethering means. The tethered cage enclosure includes a buoyancy control means located internally in a central spar, or about its periphery in the form of an inflatable collar.

Ocean-positioning signals may be obtained from Global Positioning System (GPS) signals that are broadcast continuously by a network of geosynchronous satellites through the antenna receiver of the ocean-going fish farming structure. An antenna mounted on the topside buoy receives and analyzes the GPS signals to determine and maintain the open ocean structure in a geostationary position within the ocean environment.

In another embodiment, ocean-positioning signals having increased positional accuracy when corrected for differential positioning error may be transmitted from a shore station through shore-based radio telemetry to the antenna receiver on the cage enclosure or topside buoy. Alternatively or in addition, the cage structure or topside buoy can have an underwater receiver that receives ocean-positioning signals transmitted underwater from a transponder placed in a fixed position on the ocean floor.

According to a further preferred embodiment, a tender ship maintaining a presence in the ocean in vicinity of the fish farm structures functions as a command and control center receiving and transmitting radio signals with the ocean structures to direct and maintain the structures' locations within the ocean. The tender ship is also available to service the structures and to supply the structures with fish feed and fuel.

The open-ocean structures can employ a combination of technologies for its power and propulsion systems including, for example, solar, ocean thermal energy conversion (OTEC), Stirling-type heat sink engine, and hybrid engines. One preferred power generation method comprises a heat engine housed within the topside buoy heated by a solar concentrator and cooled by surface water. An alternative preferred method involves a solar engine aided by the combustion of bio-fuels. The electrical energy so generated is then available to power the propulsion means, pump water and air into and out of the structure and cage enclosure, and power the feeding apparatus, and may be stored in batteries located on the topside buoy or within the cage enclosure.

As another aspect of the invention, a submersible open-ocean structure for maintaining a healthy growing environment for an open-ocean fish resource comprises:

(a) a submersible cage enclosure for use in the open ocean for confining growth of an open-ocean fish resource within a cage volume contained therein, said submersible cage enclosure having a buoyancy control means and being capable of submerging to a depth suitable for growth of the open-ocean fish resource confined therein and to minimize surface wave and tidal forces on the submerged cage structure;

(b) a topside buoy tethered to the submersible cage enclosure that stores feed and generates power;

(c) a conduit means between the topside buoy and cage enclosure for delivering power and fish feed to the cage enclosure and for transmitting communications between the topside buoy and cage enclosure;

(d) a propulsion means attached to the cage enclosure and optionally also to the topside buoy; and (e) bi-directional telemetry and communications between the open-ocean structure and a stationary shore, vessel or underwater position and a global positioning system.

A further aspect of the invention encompassing the use of a topside buoy to store fuel and fish feed, and that includes some or all the components comprising a dynamic positioning system, and that generates power using solar resources.

A further aspect of the invention encompasses a system for growing an open-ocean fish resource in a submersible open-ocean structure, or in a flotilla of open-ocean structures, as stated above.

The invention uniquely integrates complementary marine technologies to create a new capability for open ocean aquaculture and related operations requiring unmanned, extended marine deployment in deeper ocean waters without the need for tethering or anchoring to the ocean floor. The open-ocean structure is especially suitable for growing marine fin-fish in submersible, non-anchored cages allowing for the cultivation of open-ocean marine aquaculture products which require years to grow. Ancillary features of the invention include improvements in open-ocean aquaculture cage structures, remote positioning and position sensor packages for oceanography and surveillance, hybrid energy production platforms, off-shore OTEC power generation and hydrogen production, shore-to-ocean signal relay stations, and capability for marine exploration.

Other objects, features, and advantages of the present invention will be explained in the following detailed description of the invention having reference to the appended drawings.

DETAILED DESCRIPTION OF THE INVENTION

In the following detailed description of the invention, certain preferred embodiments are illustrated and described in order to provide certain specific examples for implementation of the invention. The preferred examples include certain preferred cage enclosures, autonomous buoys, automated positioning systems, submersible systems and subsystems, food storage and dispersal systems, power generation and propulsion systems, and monitoring systems. However, it will be recognized by one skilled in the art that many other variations and modifications may be made given the disclosed principles of the invention.

The invention employs the use of cage enclosures in the ocean for containing fish or other marine resource to be grown therein. Examples of such sea cages are known. The operation of this type of cage with a central stem and air chamber for controlling buoyancy for surfacing or submerging, and with mesh netting on its outer boundaries for containing the fish, is also well known to those familiar with this field, and the known aspects of these components are therefore not described in detail herein.

Open Ocean Submersible Structure 10

One preferred embodiment of the open ocean submersible structures of the present invention comprises an autonomous submersible cage enclosure that houses all the necessary subsystems such as the global positioning system, dynamic position system, and power generating systems. This preferred embodiment was described and illustrated in detail in parent application Ser. No. 11/849,338.

Figure 1:
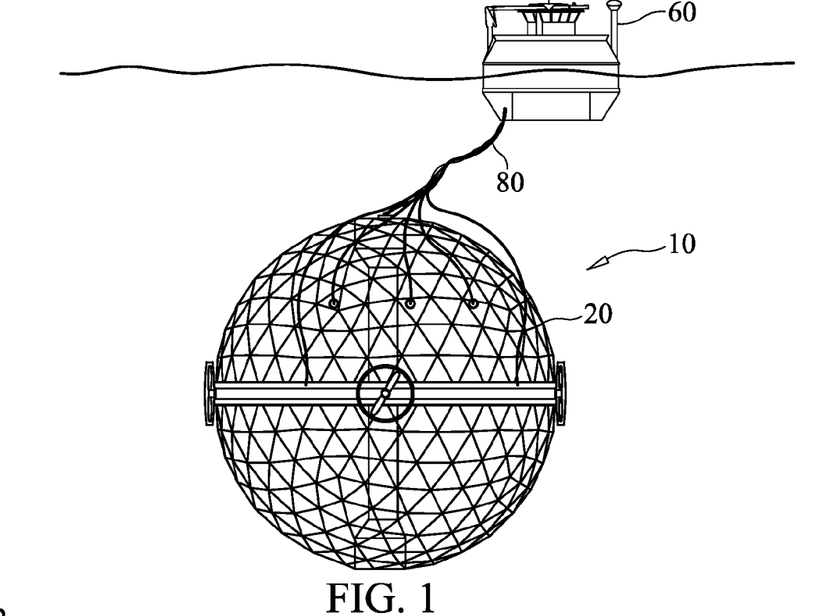
FIG. 1 illustrates from the side an open ocean submersible structure 10 of the present invention with cage enclosure submerged.

A further preferred embodiment of the open ocean submersible structures of the present invention is the open ocean submersible structure 10 illustrated in FIG. 1 from the side. Submersible structure 10 comprises a cage enclosure 20 tethered to an autonomous topside buoy 60 by means of a tether assembly 80.

Figure 6:
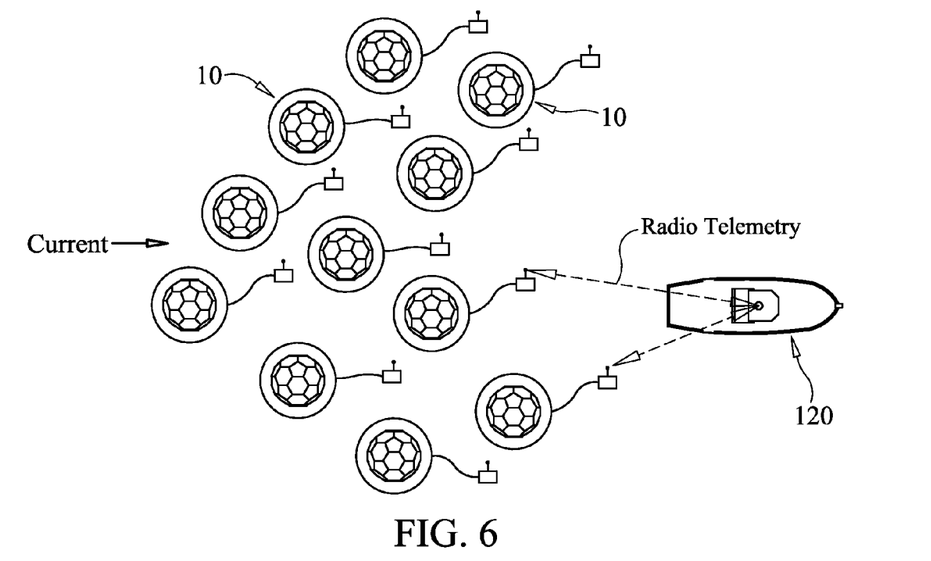
FIG. 6 shows a flotilla of structures 10 demonstrated a flying V pattern deployed in a designated ocean zone attended by tender ship 120.

Open-ocean submersible structure 10 is deployed in the open ocean environment, and multiple structures 10 can be attached in modular fashion or deployed in a spaced flotilla pattern at sea to comprise a system for open ocean fish farming as illustrated in FIG. 6 and further described below.

Cage Enclosure 20

The details and components of cage enclosure 20 are described with reference to FIG. 2. For aquaculture, cage enclosure 20 may be formed in a rigid sphere made up of tubular sections assembled modularly with each module netted in biofouling-resistant mesh.

According to the preferred embodiments depicted, cage enclosure 20 is comprised of a plurality of struts 22 and hubs 24 interconnected to form the exoskeleton of enclosure 20 demonstrating a geodesic sphere. Enclosure 20 may be formed from two opposed geodesic domes affixed one to the other at their bases. Geodesic structures combine structural stability with overall strength and efficiency and require no internal columns for support.

Struts 22 and hubs 24 interconnect to form a plurality of triangular panels 26 comprising the outer periphery of enclosure 20, however it will be appreciated that hubs 24 can be configured such that panels 26 that form the outer periphery of enclosure 20 demonstrate a variety of alternative shapes, such as, for example, hexagonal. Enclosure 20 can be variously sized, with more or less panels 26 and with panels 26 of different sizes and shapes. Panels 26 can be made removable for cleaning and/or replacement.

In order to accommodate an appropriately populated farm of large fin fish for example, cage enclosure 20 will have a diameter that ranges from 33 to 55 meters, although enclosures with larger or smaller diameters are also possible without departing from the scope and intent of the present invention. A cage enclosure having a diameter of 55 meter would be suitable for growing up to 20,000 tuna, for example.

Cage enclosure 20 is further enclosed within an outer mesh netting (not shown) to confine the growth of pelagic fin fish or other species of marine resource therein. For raising tuna, the netting may be one-square stitching and may be constructed from synthetic materials that demonstrate strength and resist bio-fouling. The netting may, in addition, be treated with non-toxic anti-bio-fouling material. The netting is removable and replaceable.

According to an alternative preferred embodiment of cage enclosure 20, not illustrated, several of the panels 26 towards the bottom of enclosure 20 may employ wider mesh netting relative to the other panels 26 with larger voids that permit the entrance of squid for example. Blue and green LEDs, known to attract squid, can be mounted on enclosure 20 and used to entice squid into enclosure 20 as a supplemental feed source.

Figure 2:
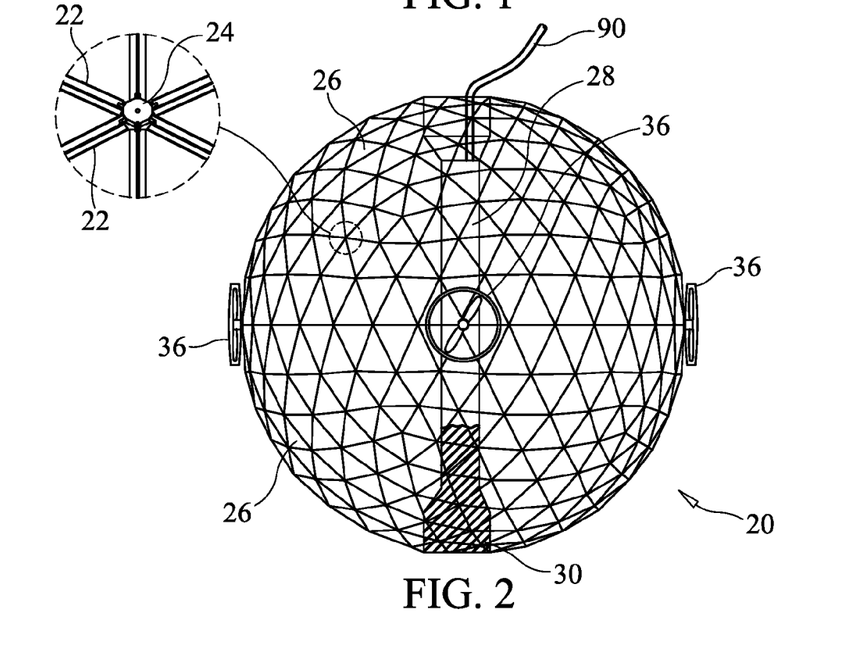
FIG. 2 shows the details of a first preferred embodiment of cage enclosure 20 from the side.

Also as illustrated in FIG. 2, cage enclosure 20 has a central spar 28. FIG. 2 depicts a first preferred embodiment of cage enclosure 20 wherein the buoyancy control means is comprised of a buoyancy control chamber 30 within the lower aspect of central spar 28

Central spar 28 may optionally include subsystems for food storage and distribution, power generation and storage, global and dynamic positioning, communications, monitoring, auxiliary propulsion, command and control, etc. As discussed below, some or all of these subsystems may alternatively or additionally be housed in topside buoy 60.

Video monitoring of cage enclosure 20 may be used to identify breaches in the netting and damage caused by external means such as vandalism or predators, monitor fish health and observe fish consumption of feed.

Optionally provided at the upper and/or lower ends of central spar 28 of enclosure 20 (but not shown in FIG. 2) are hydroacoustic (or optical) sensor arrays and transducers for receiving and transmitting underwater signals for positioning in the ocean and/or communicating between structures 10 and/or with a shore station or tender ship. Underwater transducers for bi-directional communications may alternatively, or in addition, be mounted on the underside of topside buoy 60 as illustrated in FIG. 5C and described in conjunction with this illustration.

Enclosure 20 is equipped with a means for its submersing and surfacing involving the introduction of compressed air to displace sea water. According to the first preferred embodiment illustrated in FIG. 2, compressed air is pumped from topside buoy 60 through a compressed air hose 90 into the upper aspect of central spar 28, displacing sea water from buoyancy control chamber 30 and causing enclosure 20 to become more buoyant and rise to the ocean surface. Conversely, when compressed air is allowed to escape from buoyancy control chamber 30, either back up through air hose 90, or through a valve directly into the surrounding ocean, sea water re-enters chamber 30 of central spar 28, enclosure 20 becomes denser and sinks below the water surface to a depth permitted by tether assembly 80. By carefully controlling the amount of condensed air introduced into buoyancy control chamber 30, equilibrium may be achieved whereby the overall density of enclosure 20 matches the density of the surrounding sea water allowing enclosure 20 to be maintained at a given, intermediate, depth below the ocean surface.

Figure 2A:
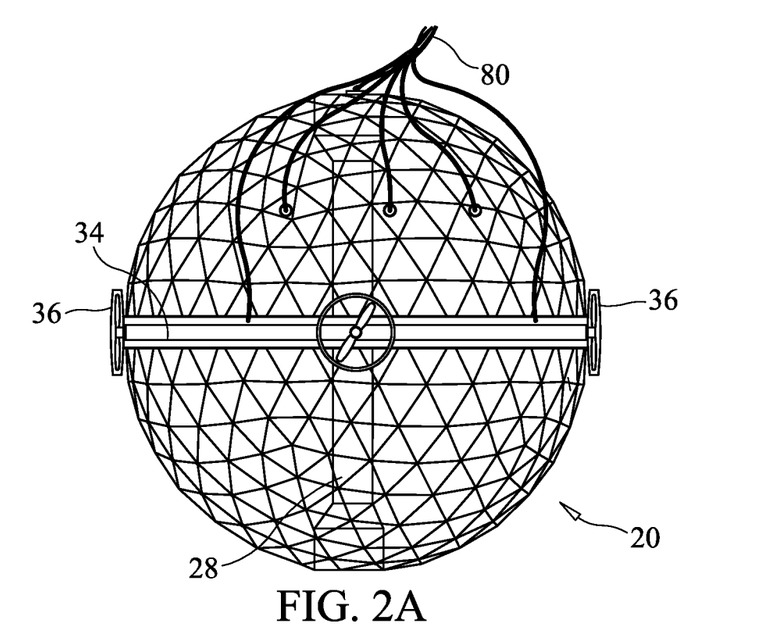
FIG. 2A is an alternative embodiment of cage enclosure 20, also from the side, with an inflatable collar positioned around the circumference of enclosure 20.
Figure 2B:
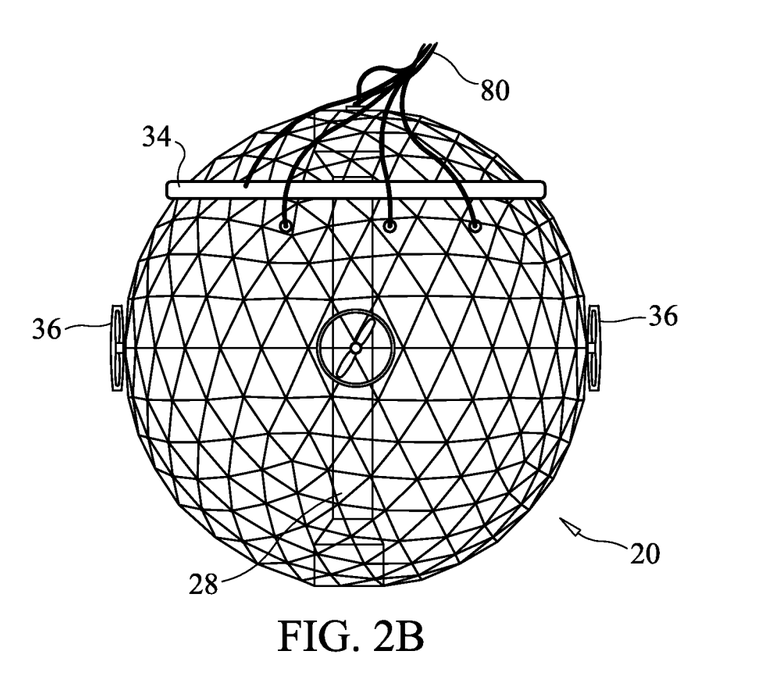
FIG. 2B is a side view of a further alternative embodiment of cage enclosure 20 with inflatable collar around the enclosure's upper aspect.

According to alternative preferred embodiments, enclosure 20 is equipped with an inflatable collar 34 which, like buoyancy chamber 30, is filled with compressed air to cause cage enclosure 20 to become buoyant and rise to the ocean surface. Collar 34 can be positioned around the circumference of enclosure 20, as shown in FIG. 2A, or around the upper portion of enclosure 20, as shown in FIG. 2B. According to either of these alternative embodiments, enclosure 20 is submerged by expelling compressed air contained in collar 34, and is raised by inflating collar 34 with compressed air supplied by topside buoy 60.

Enclosure 20 is raised to the water surface to facilitate cleaning, introduce fingerlings, or harvest mature fish. Collar 34, when inflated, also forms a platform on the water surface upon which those servicing the structure can stand and work from. Those aspects of enclosure 20 below collar 34 that remain submerged may be cleaned by divers, and panels 26 of enclosure 20 can be designed to be removable, further facilitating cleaning and replacement of panels 26.

According to a further preferred embodiment, not shown, the netting of cage enclosure 20 is cleaned using a robotic net cleaner that removes bio-fouling from the enclosure's netting.

Cage enclosure 20 is further equipped with a propulsion means 36 to propel and maintain the position of structure 10 within the ocean environment. Accordingly to the embodiment illustrated in FIG. 2, propulsion means 36 comprises a plurality of fully enclosed 360° electric-powered thrusters on opposite lateral sides providing 180° steerable mobility in its depth plane. Thrusters 36 work in concert with the propulsion means, if any, integrated into topside buoy 60, to move structure 10 from one location to another, and to counteract the forces of ocean currents and wind in order to maintain structure 10 in a geostationary position within the ocean environment and in relation to any neighboring autonomous structures 10.

A further tunnel thruster (not shown) may optionally be mounted within cage 20, for example on central spar 28, to assist the propulsive forces provided by perimeter thrusters 36 to better allow for the dynamic positioning of enclosure 20 within the ocean environment.

Propulsion means 36 is electrically powered utilizing electricity generated by the power generating means housed in topside buoy 60, or optionally through an OTEC or hybrid power generating means (not shown) housed within cage enclosure 20.

According to a further preferred embodiment, also not shown, a vertically oriented skeg is provided at the trailing lateral side of cage enclosure 20 to stabilize the enclosure from a tendency toward rotational movement in an ocean current flow and to keep cage enclosure 20 from a tendency to over-rotate when thrust is provided by propulsion means 36 for turning.

An intelligent global positioning system/dynamic control positioning system may be housed within the upper portion of central spar 28 in lieu of the GPS/DCPS system housed within topside buoy 60 as described below. According to a further alternative embodiment (not shown), cold seawater is drawn up by optional jet thruster located in center spar 28. The pumped seawater may be used to assist an OTEC power plant, dispense feed and help position enclosure 20 as mentioned above.

Cage enclosure 20 is maintained in the upright position by buoyancy control chamber 30 and/or ballast 31 located at the bottom of central spar 28.

Topside Buoy 60

Figure 3:
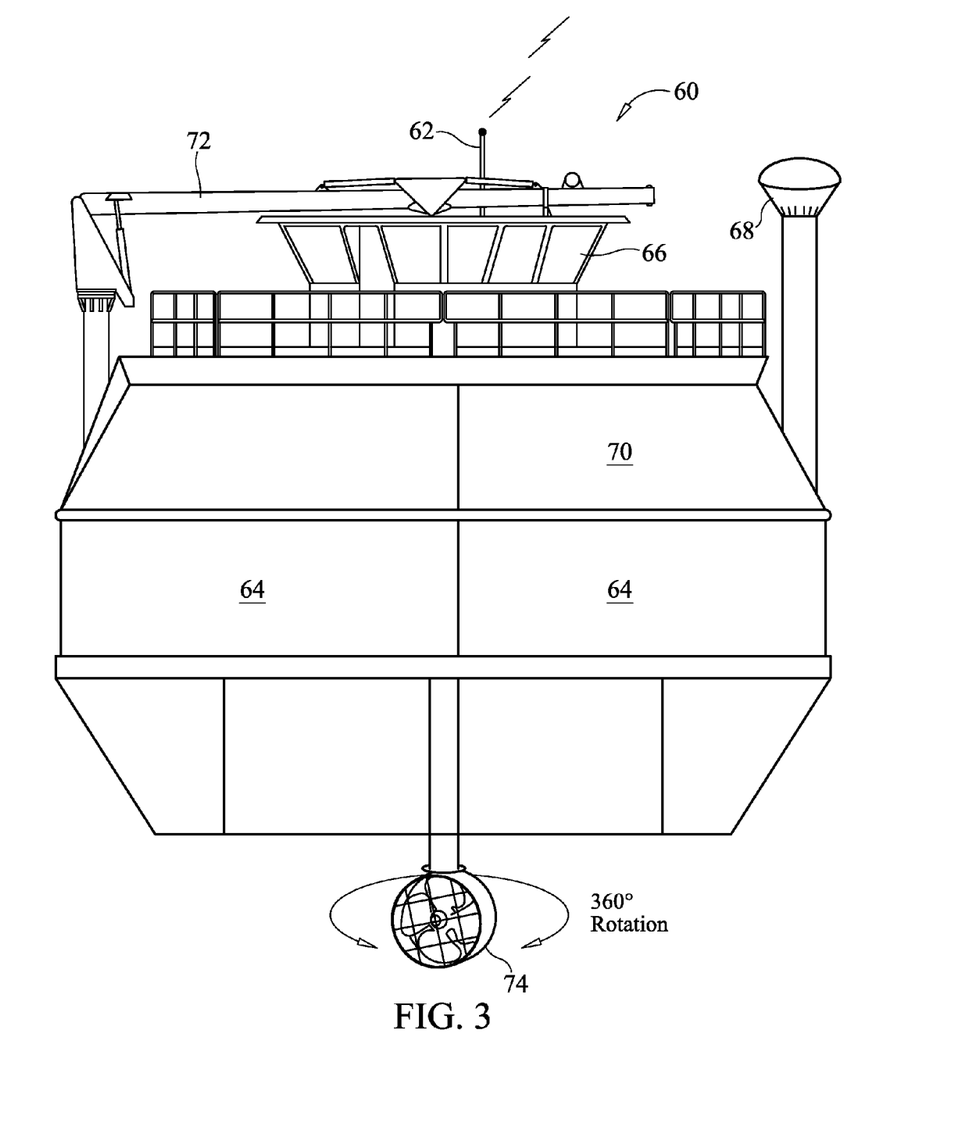
FIG. 3 illustrates topside buoy 60, from the side, and its component parts.
Figure 3A:
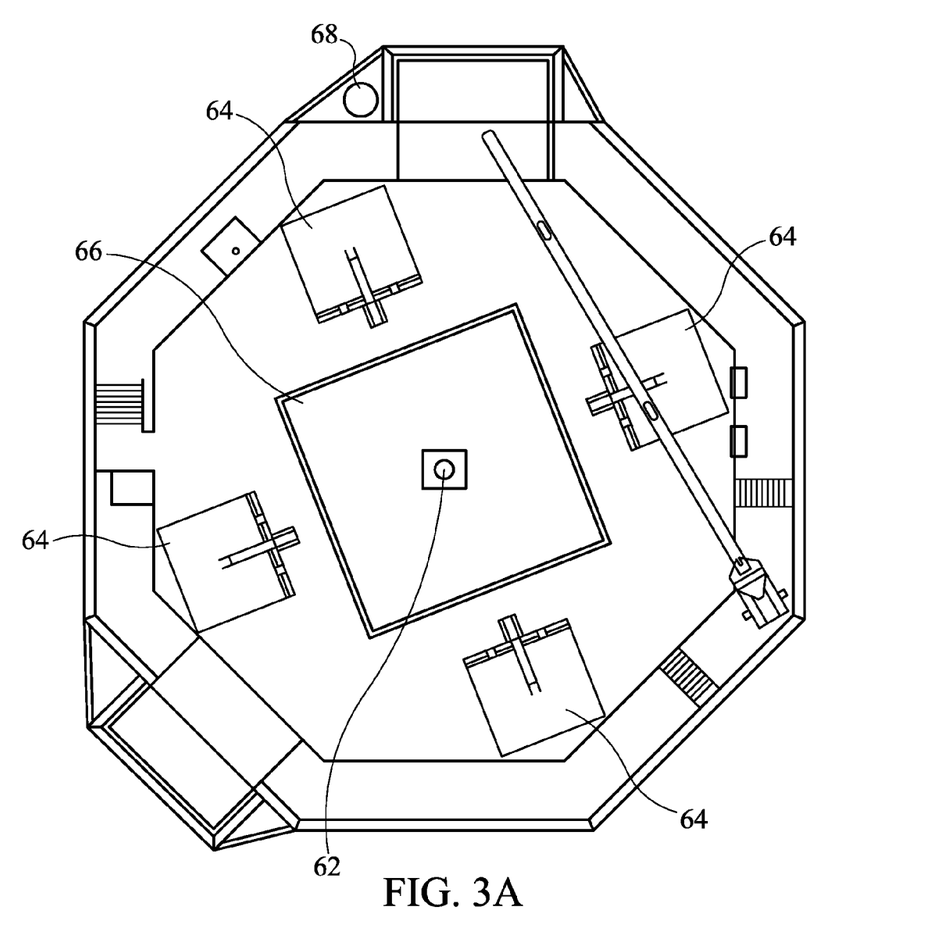
FIG. 3A is a top view of topside buoy 60 and some of its component parts.

Illustrated in some detail in FIG. 3, from the side and FIG. 3A from above is topside buoy 60. Topside buoy 60 includes a radio antenna 62, feed storage bins 64, an optional pilot house/crew quarters 66, a solar concentrator 68, a heat engine 70, an optional crane 72, and an optional topside propulsion means 74. Also housed within topside buoy 60 (but not specifically illustrated in FIG. 3) is a topside GPS/DCPS and a control and command center which allows communications, positioning, submersing, and feed storage and dispensing operations to be monitored and remotely controlled.

Radio antenna 62 extending from the above-surface aspect of buoy 60 functions as a sensor/transmitter/transducer to communicate with GPS, land based radio telemetry, or vessel based radio telemetry as, for example, from and to a tender ship 120 described below.

Feed storage compartment 64 has space to store as much as 100 metric tons, more or less, of fish food. Feed storage compartment 64 on topside buoy 60 must have capacity to store food sufficient to maintain the fish population within enclosure 20 between food deliveries. An enclosure supporting 20,000 mature tuna may be expected to consume more than 100 tons of fish feed twice monthly.

Processed fish food pellets delivered to topside buoy 60, for example, by tender ship 120, are stored in feed storage bins 64 for delivery to cage enclosure 20 through tether assembly 80. Bins 64 are pressurized with dry air to preserve the integrity and freshness of the food. The feed is automatically dispensed into cage enclosure 20 through a feeder hose 86 (described and illustrated below) by a computer activated mechanized dispenser.

Topside buoy 60 also generates electricity to power the various subsystems that are located on the topside buoy 60 and within or on cage enclosure 20 as for example, communications systems, dynamic position systems, food dispersion apparatus and propulsion means, and to storage batteries which may also be located on either or both topside buoy 60 or cage enclosure 20.

Power may be generated on topside buoy 60 through energy harnessed from the sun by photovoltaic devices. Photovoltaic devices may take the form of flat panels or solar concentrators. Solar concentrators use mirrors to reflect and concentrate sunlight onto receivers that then collect the solar energy and convert it to heat. The thermal energy can be used to produce electricity with a steam turbine or heat engine driving a generator.

According to the preferred embodiment depicted in FIGS. 3 and 3A, in order to present a small footprint, solar concentrator 68 is a Fresnel Lens fashioned in a hemispherical shape made from acrylic, which focuses the solar energy through a sealed cone, onto a single location on heat engine 70, even in the presence of wave movements. The cooling of heat engine 70 is accomplished with a refrigerant pumped through a heat exchanger using ambient seawater to provide the heat sink.

Alternative means of generating solar energy, through either solar panels or other forms of solar concentrators, may be used to power turbines or heat engines. Solar energy can be combined with other forms of energy, such as that from combusting bio-fuels, to form a hybrid engine. The energy can be used to power a Stirling engine, for example, in order to obtain the efficiencies offered by such engines.

The use of on-board OTEC or hybrid OTEC aided by solar or other power generating means can also be used for hydrogen generation from seawater. Hydrogen may be in demand as a fuel for fuel cell and hydrogen-powered cars. Producing hydrogen at sea provides an advantage over its production on shore where space is scarce and valuable. Seawater is "cracked" into its component parts using the onboard energy generating means. The hydrogen is captured and transported back to land, on tender boat 120 or harvest vessel 130 for example (described below), for distribution as an alternative fuel.

The GPS/DCPS may be located on topside buoy 60 or within the upper aspect central spar 28 of cage enclosure 20. The details of the functioning of GPS/DCPS are discussed below.

Topside buoy 60 may, optionally, have its own propulsion means 74 to compensate for wave action and to minimum tensions on tether assembly 80. According to the preferred embodiments depicted, propulsion means 74 attached to buoy 60 would complement, and not replace, the propulsion means 36 attached to cage enclosure 20 as described above. In accordance with other preferred embodiments not shown, propulsion means 74 would replace the propulsion means 36 onboard cage enclosure 20.

Propulsion means 74 depicted in FIG. 3 takes the form of a Z drive propulsion system with caged propeller that extends from the underside of buoy 60 and is rotatable 360 degrees. Such a propulsion system allows buoy 60 to be propelled through the ocean in any direction. Propulsion means 74 could, alternatively, comprise for example a rotatable jet drive without propellers or electric tunnel thruster.

Propulsion means 74 is electrically powered utilizing electricity generated by the solar powered heat engine 70 housed in topside buoy 60, or through an OTEC or OTEC hybrid power generating means housed within cage enclosure 20, as well as electricity stored in storage batteries located topside or below surface.

Tether Assembly 80

The details of tether assembly 80 are described with reference to FIG. 4. Tether assembly 80 is comprised of a main tether 82 and a tow bridle 84. Bundled with main tether 82 are a plurality of feeder hoses 86, one or more electrical supply lines 88, one or more compressed air hoses 90, and one or more communications lines 92. Addition lines or hoses dedicated to other purposes, for example, may also be bundled with main tether 82 and the above enumerated hoses and lines. The lines, hoses and main tether 82 and tight linked or wrapped for a majority of their length to minimize the risk of line entanglement.

Communications line 92 would be used to transmit data between topside buoy 60 and central spar 28 of enclosure 20. Such data would include, for example, communications data from an underwater transducer mounted on the underside of enclosure 20, dynamic control positioning system data if the control system were located within enclosure 20, data from video surveillance and radar sensors mounted to enclosure 20, etc.

Compressed air hose 90 in the depicted embodiment connects to inflatable collar 34. In the alternative embodiment depicted in FIG. 2, compressed air hose 90 is shown connecting to the upper aspect of central spar 28.

Main tether 82 attaches to the underside of topside buoy 60 through a swivel attachment 94. Swivel attachment 94, which includes a disconnect, allows cage enclosure 20 to rotate relative to topside buoy 60 without crimping of tether 82 or loss of communications there through and permits cage enclosure 20 some range of motion relative to topside buoy 60, deflecting forces experienced from current and directional propulsion, for example.

Main tether 82 is a very strong cable and may be fabricated of Dyneema or other strong material like steel. Tether 82 attaches to the upper portion of cage enclosure 20 through bridle 84. Bridle 84, which can take the form of a shackle, u-bolt, steel thimble splice or the like, or a combination of these, attaches to a tether plate 96 that is secured to the top of central spar 28. Bridle 84 facilitates connecting and disconnecting from tether plate 96 and also allows some rotation.

Once hoses 86 and 90 and lines 88 and 92 reach the top of enclosure 20 they split apart, at some point past tether bridle 84, along the inside and/or outside surface of enclosure 20 except in the case of the embodiment depicted in FIG. 2, wherein compressed air hose 90 continues into the upper aspect of central spar 28.

Fish feed automatically dispensed from feed storage bins 64 (seen in FIG. 3), travels first through feeder hoses 86 running along main tether 82, then along the inside or outside surface of cage enclosure 20, to a point on the upper aspect of the surface of cage enclosure 20 where the food is released into cage 20 and dispersed therein by ocean currents.

Typically, cage enclosure 20 will be submerged to a depth of 20 to 23 meters when measured from the surface of the ocean to the top of enclosure 20. So, for an enclosure 55 meters in diameter, enclosure 20 will be submerged to a point where the top of enclosure is 20 meters below the ocean surface, the bottom the enclosure is 75 meters below the ocean surface, and the center of the cage enclosure is 37.5 meters below the surface. Lesser and greater depths are possible and the preferred depth may depend upon the prevailing or temporary ocean and weather conditions.

Figure 4:
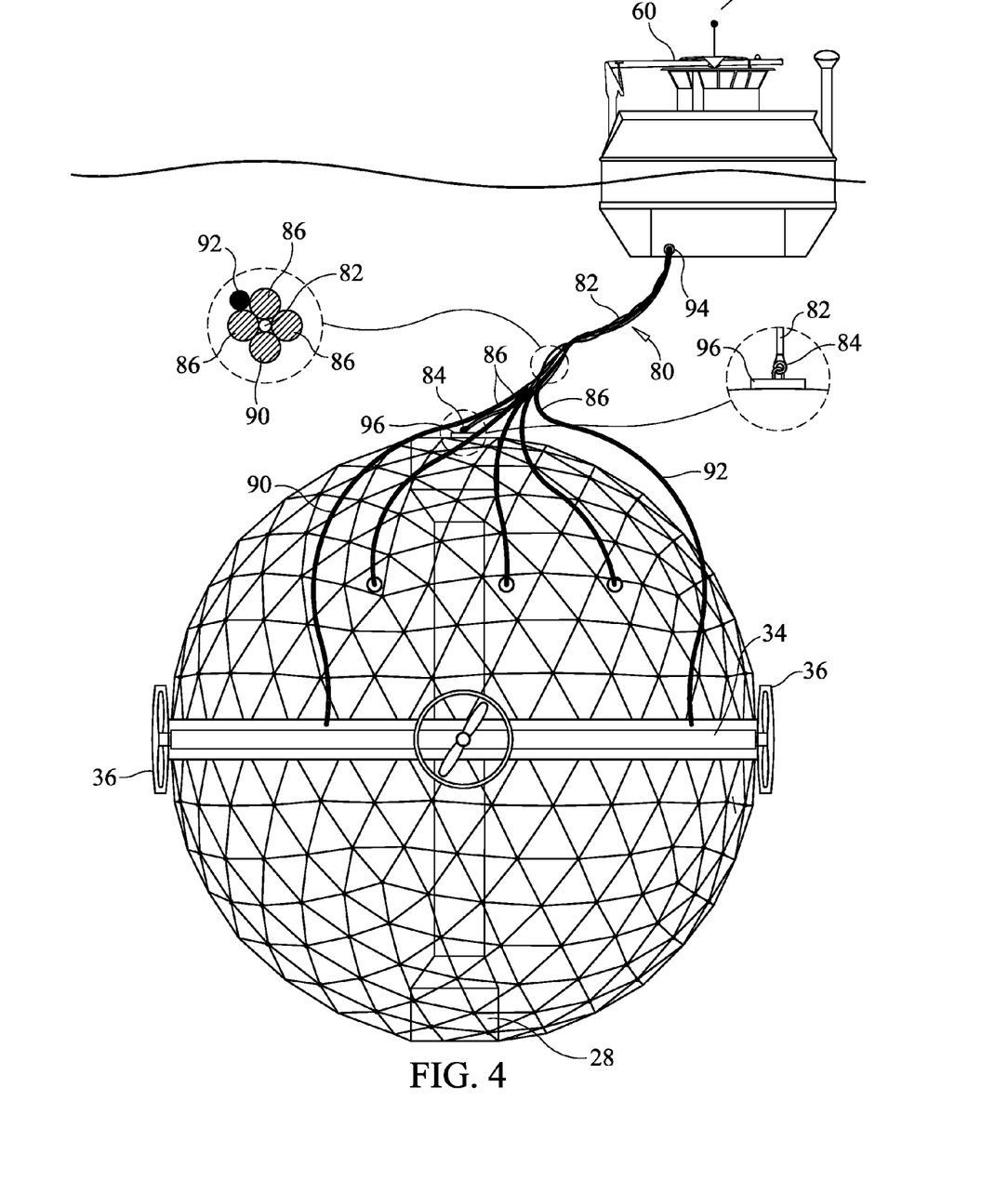
FIG. 4 illustrates structure 10 from the side showing details of tether assembly 80 with tow bridle 84.

The length of tether 80 in FIG. 4 and the other figures in which tether 80 is shown is not to scale. Tether assembly 80 will have a length sufficient to accommodate an enclosure 20 being submerged to the desired depths, and be long enough to allow enclosure 20 to surface and not interfere with, or contact, topside buoy 60. Assuming a default operational depth of 20 meters from top of a cage enclosure 55 meters in diameter, the minimum length for tether assembly 80 would be on the order of 50 meters. The length of tether 80 should preferably demonstrate a 4:1 ratio relative to the diameter of enclosure 20 in order to minimize stress forces, and to enhance safety and navigability, suggesting a tether 80 length of 200 meter or more in the case of a cage enclosure of 55 meters diameter. Because the depth of enclosure 20 is determined by the structure's dynamic control positioning system and buoyancy control chamber 30, the additional length of tether 80 will not cause enclosure 20 being submerged deeper than is desired.

Sea Anchors 38

Figure 4A:
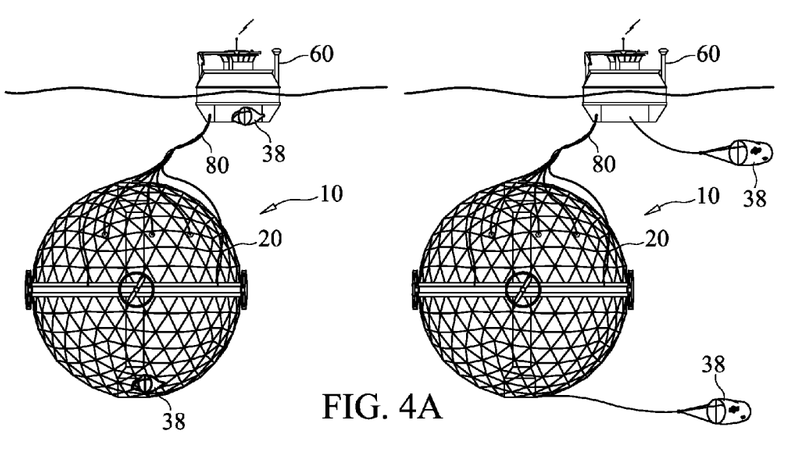
FIG. 4A shows structure 10 with sea anchors 38 stowed and deployed.

Illustrated in FIG. 4A is the stowage and deployment of optional sea anchors 38, also sometimes referred to as drift anchors and drift socks. Stowed under normal conditions within the bottom aspects of cage enclosure 20 and topside buoy 60, sea anchors 38 may be deployed, for example, when there is a failure of the propulsion, power or command and control systems of structure 10. Sea anchors 38 function as a brake by pulling large amounts of water along as structure 10 moves, countering the effects of high winds and waves. Sea anchors 38, when deployed, slow the speed of drift of structure 10 caused by the prevailing wind and wave conditions, allowing a stranded structure 10 to be reached by a rescue vessel more quickly and making it less likely that a disabled structure 10 will run aground.

Sea anchors 38 may also be deployed when structure 10 is not distressed but encountering strong currents. Sea anchors 38 deployed during strong current conditions assist in lowering drift drag and consequential demand on the power system.

Dynamic Positioning

Figure 5A:
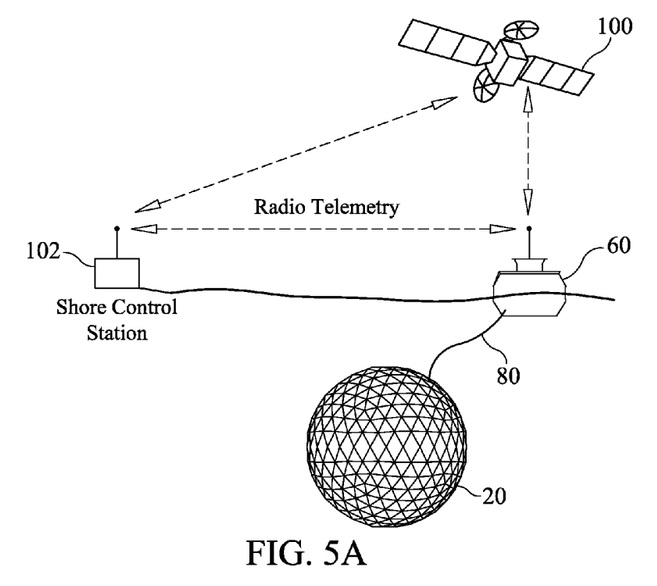
FIG. 5A illustrates the GPS/DCPS utilizing bi-directional communications between structure 10 and shore control station 102.
Figure 5B:
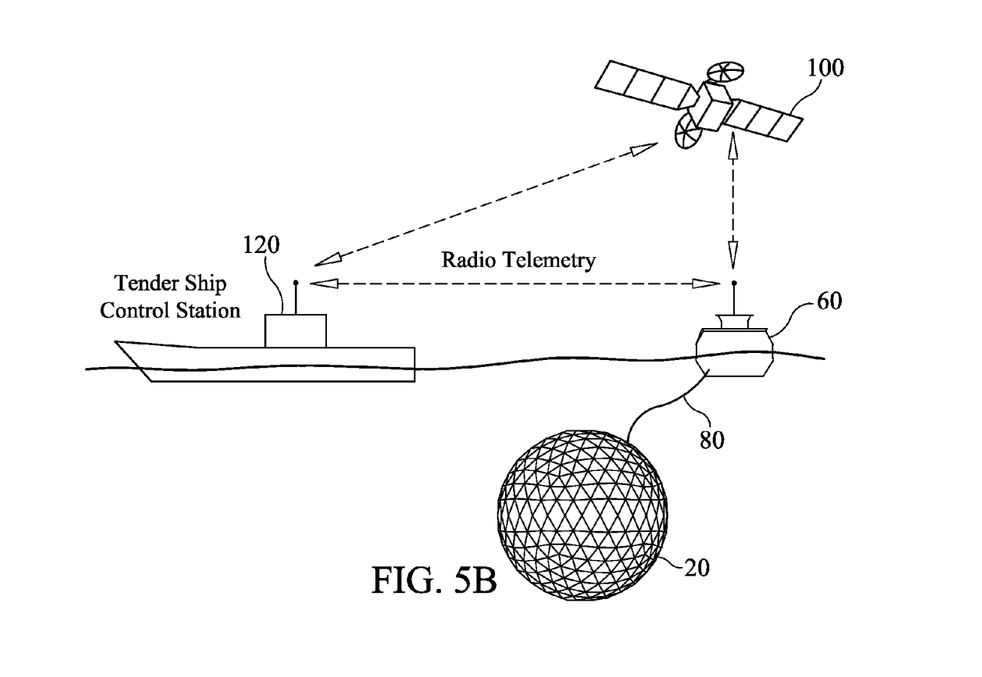
FIG. 5B illustrates the GPS/DCPS utilizing bi-directional communications between structure 10 and tender boat 120.
Figure 5C:
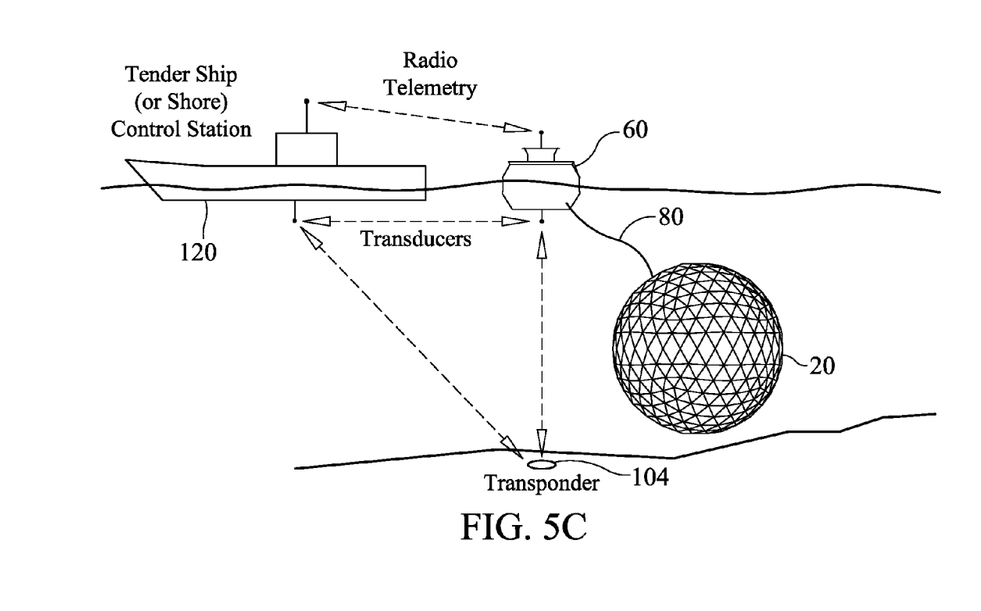
FIG. 5C illustrates the GPS/DCPS utilizing bi-directional communications between structure 10 and underwater transponder 104.

The open ocean structures 10 of the present invention utilize global positioning systems (GPS) and dynamic control positioning systems (DCPS), as illustrated in FIG. 5, to autonomously navigate and maintain a geostationary position within the ocean environment, and also to maintain their spaced apart position one to another within a flotilla of structures 10. The structure's GPS and DCPS are monitored remotely and can be overridden remotely.

Signal receiver devices are used to receive an ocean-positioning signal transmitted from an external source (GPS, shore station, tender ship or underwater sonar buoy), and provide a geostationary-error signal for positioning the open ocean structure 10 so as to maintain it in approximate correspondence with a predetermined geostationary position in which structure 10 is to remain positioned. This automated positioning eliminates the need to anchor structure 10 to the ocean floor or to moor it to an anchored buoy, thereby allowing it to operate in greater ocean depths, such as in the exclusive economic zone under international protocols.

Depicted in FIG. 5A is GPS/DCPS utilizing radio telemetry triangulation between a GPS satellite 100, topside buoy 60, and a shore control station 102. Depicted in FIG. 5B is GPS/DCPS utilizing radio telemetry triangulation between GPS satellite 100, topside buoy 60 and a tender ship 120. Depicted in FIG. 5C is GPS/DCPS utilizing under water transponder triangulation between an underwater transponder 104 anchored to the ocean floor, a transponder affixed to the underside of topside buoy 60, and a transponder affixed to either tender ship 120 (shown) or a shore control station. A Control Station associated with transponder 104 calculates structure 10's position relative to transponder 104 and transmits corrective instructions back to structure 10 remotely operating structure 10's propulsion means.

Structure 10 may preferably use GPS signals with differential error correction relayed from a shore station or a tender ship. Communication to structure 10 is accomplished with radio control telemetry to antenna 62 located on topside buoy 60 (FIGS. 5A and 5B), and/or through acoustic/optical subsurface transducer located on cage enclosure 20, for inter and intra structure networking. The radio antenna is used to send and receive radio signals. A GPS sensor is placed at the top of antenna 62 to maintain contact with GPS satellites. Hydro-acoustic transducers may be placed in an array along the top and bottom of cage enclosure 20, or on the bottom of topside buoy 60, for inter-structure communication and networking.

Structure 10 dynamically and continuously applies corrective thrust force from the propulsion means located on cage enclosure 20 and optionally, topside buoy 60 to steer toward a target geostationary position within a defined area, such as a designated unit position within an aquaculture lease zone of a designated operator. Its on-board geostationary-position-correction controller derives a geostationary-error signal for structure 10 in the ocean based on an ocean-positioning signal received by its signal-receiving unit. The geostationary-error signal is then used to derive propulsions command signals to direct the propulsion means to generate a corrective propulsive force to steer structure 10 continuously toward the desired target geostationary position.

In a preferred embodiment, open-ocean submersible structure 10 derives its geostationary-error signal based on differential position GPS signals received from the shore station (FIG. 5A) or tender ship (FIG. 5B) for more accurate error determination. The GPS system of geosynchronous satellite position transponders has been designed to be accurate, however, there are errors caused by Atmospheric Conditions, Ephemeris Errors (Clock Drift/Measurement Noise), Selective Availability (Department of Defense alterations), and Multipath caused by reflections. Collectively these errors can add up to an overall error of 15 meters of uncertainty. Differential correction is necessary to get accuracies within 1 to 3 meters. Differential correction requires a second GPS receiver at a base station collecting data at a stationary position on a precisely known point, such as at a shore station within radio transmission proximity to the fish-growing cage units within their lease zone. The physical location of the reference location is known, therefore a correction factor can be calculated and compared to the reference location with the GPS location determined by using the same satellites. The shore station downloads current GPS position coordinates transmitted from the platform and compares them to the shore station's more accurately known position coordinates to derive differential coordinates to more accurately pinpoint the platform's current position. This correction factor is then transmitted to structure 10 which uses the correction factor in its calculation for its precise current position.

Correctional control to maintain a geostationary position is overridden in the event of an unanticipated vessel approach or inclement weather. An approaching vessel will be sensed by the transducer array and reported directly to the command and control center which will direct the structure to navigate away from the hazard.

Preferably, each structure 10 will run an intra-structure control algorithm and an inter-structure control algorithm. The intra-structure control algorithm is responsible for maintaining each structure's absolute position relative to the Global Positioning System and differential position relative to the shore station or tender ship. The inter-structure algorithm will be secondary to the intra-structure algorithm and operative to maintain the subject structure's position relative to other structures (e.g., its position in the flying V or other pattern) within the designated lease area. The structures will communicate among each other through the hydro-acoustic transducer arrays or radio telemetry.

A backup or alternative structure 10 communication method employs an underwater position transponder as seen in FIG. 5C. A Control Station, which may be a shore station or a tender ship or both, has a transducer which is positioned in the water to send and receive communication signals to and from structures 10 at sea via a transponder placed on the ocean floor in their proximity at a known coordinate location. The transducer can send an acoustic or optical signal (by means of piezoelectric elements) to the transponder, which is triggered to reply. As the velocity of sound through water is known, the distance is known. Structures 10 can exchange communication signals with the transponder through transducer arrays affixed to their cage enclosures 20 or the underside of topside buoys 60 as shown in FIG. 5C. The shore station or tender ship's transducer is used to relay data from the Control Station to structure 10 and from structure 10 to the Control Station.

The transponder can communicate with multiple structures 10 as each structure 10 would have a unique code. The Control Station would be able to ensure through these communications that the structures 10 do not collide with one another. Control over the structures 10 propulsion systems can thus be managed by the Control Station at all times.

Control may also be maintained by radio telemetry for shorter distances within line-of-sight, and through satellite communication for longer distances.

Fish Farming System Comprising a Flotilla of Autonomous Structures

A system for open ocean fish farming employing the autonomous structures 10 of the present invention is illustrated in FIG. 6. Multiple open-ocean submersible structures 10 forming a flotilla 110 are deployed in a designated ocean zone. Structures 10 may be positioned in a flying V pattern as shown facing towards the oncoming direction of the prevailing ocean current, or in other evenly spaced patterns, each structure occupying a space within the ocean of 20 acres more or less.

Structures 10 maintain a safe spacing between themselves by using an array of hydro-acoustic transducers to listen for the sound of the other structures. A spacing control algorithm uses the acoustic transducer array to sense the other structures and formulate the flying V pattern or other designated pattern and the position of structures 10 relative to the differential position and the desired spacing model. When the sound exceeds a threshold, a structure 10 is directed using its propulsion means away from the direction of the sound.

Flotilla 110 of fish farm structures 10 is attended by a tender ship 120. Tender ship 120 is equipped with one or more of the following: a command and control station, crew quarters, feed storage facility, feed mill and fuel storage facility.

Tender ship 120 manages the structures 10 that comprise flotilla 110 and which may be positioned 50 to 100 miles or more away from shore. A command and control station aboard tender ship 120 manages structures 10 through radio telemetry to signal structures 10 position within the ocean and the depth that cage enclosures 20 are maintained below the ocean surface.

Tender ship 120 can also house the crew needed to maintain, clean and otherwise service structures 10.

In the case of those embodiments in which structures 10 use stored fuel to power communication, feed dispersion and propulsion systems, as for example bio-fuels like bio-diesel, tender ship 120 can replenish such fuel supplies as the supply on each such structure 10 is depleted.

Since fish feed needs to be delivered to the topside buoy from time to time, tender ship 120 stores fish feed in large quantities to be delivered to structures 10 as needed. A feed mill aboard tender ship 120 provides further efficiencies to the business of open ocean fish farming. Raw nutrient rich materials such as soy, algal or fish protein, Omega 3 & 6 fatty acids, and other nutrients or protein by-products are fed into the feed mill and extruded as protein rich fish food pellets. The food pellets are delivered, as needed, from tender ship 120 to the feed storage and distribution compartment 64 on topside buoys 60 of structures 10, to replenish the supply of food pellets maintained on buoys 60. As explained above, these food pellets are automatically dispensed in aliquots from buoys 60 to the fish in enclosures 20 through feeder hoses 86 within the tether assemblies 80.

Flotilla 110 may be comprised of, for example, one hundred autonomous open ocean structures 10 with each such structure occupying twenty acres, more or less, of the ocean environment. One or more tender ships 120 can be dedicated to each flotilla 110, or one tender ship 120 can be dedicated to more than one flotilla 110.

Fish Farming Life Cycle

Figure 7:
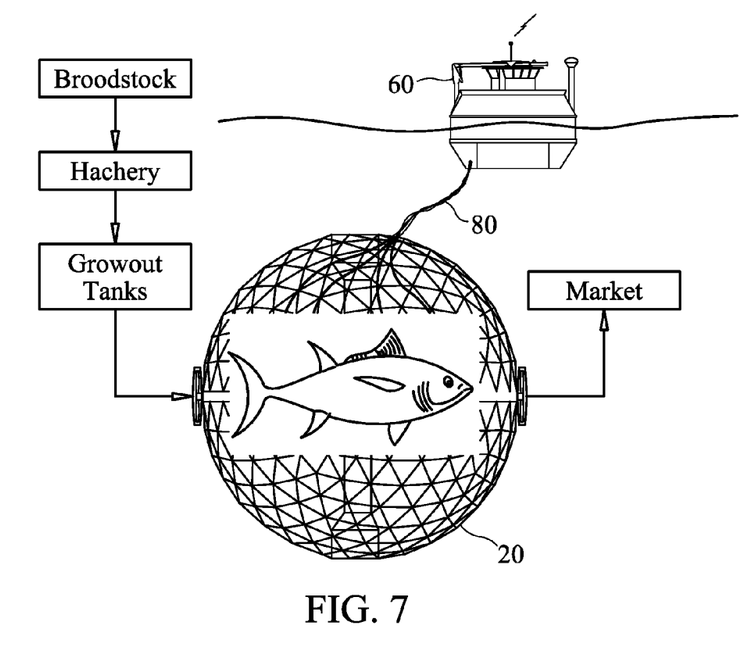
FIG. 7 illustrates the life cycle of farmed marine fin fish.

The open-ocean fish-growing cage enclosure 20 is designed to handle the maturation part of the growing cycle of the fish livestock in the ocean. As illustrated in FIG. 7 in the case of marine fin fish, the lifecycle starts with the broodstock spawning and the collection of fertilized eggs. The eggs are transferred to the hatchery where the eggs hatch and are grown to larvae stage. The larvae are then transferred to grow out tanks and grown to the fingerling size.

The fingerlings will be transferred to the cage enclosures 20 of open ocean structures 10 and raised to the time when they are at full market size. The cage enclosures 20 provide a natural environment in the ocean for the maturation growth stage of the fin fish. The growing environment is enhanced by the controlled feeding described above and the continuous flushing of cage by ocean currents. When the fish have reached a desired adult size, cage enclosures 20 are raised to the ocean surface and the fish are then harvested therefrom, processed and brought to market.

In the case of raising tuna, fingerlings may be introduced into enclosures 20 at a density such that, at maturity, there will be approximately one fish per four cubic meters of cage volume. In the case of small fingerlings, the fingerlings will be maintained inside an inner net within enclosure 20 until the fingerlings reach a size precluding their escape from the netting that envelopes enclosure 20. Assuming a mortality rate of approximately 10%, a cage enclose 55 meters in diameter might be stocked with 22,000 fingerlings and able to accommodate in excess of 20,000 mature tuna at this density. When mature and ready for harvesting, each tuna may weigh up to 100 pounds.

Figure 8:
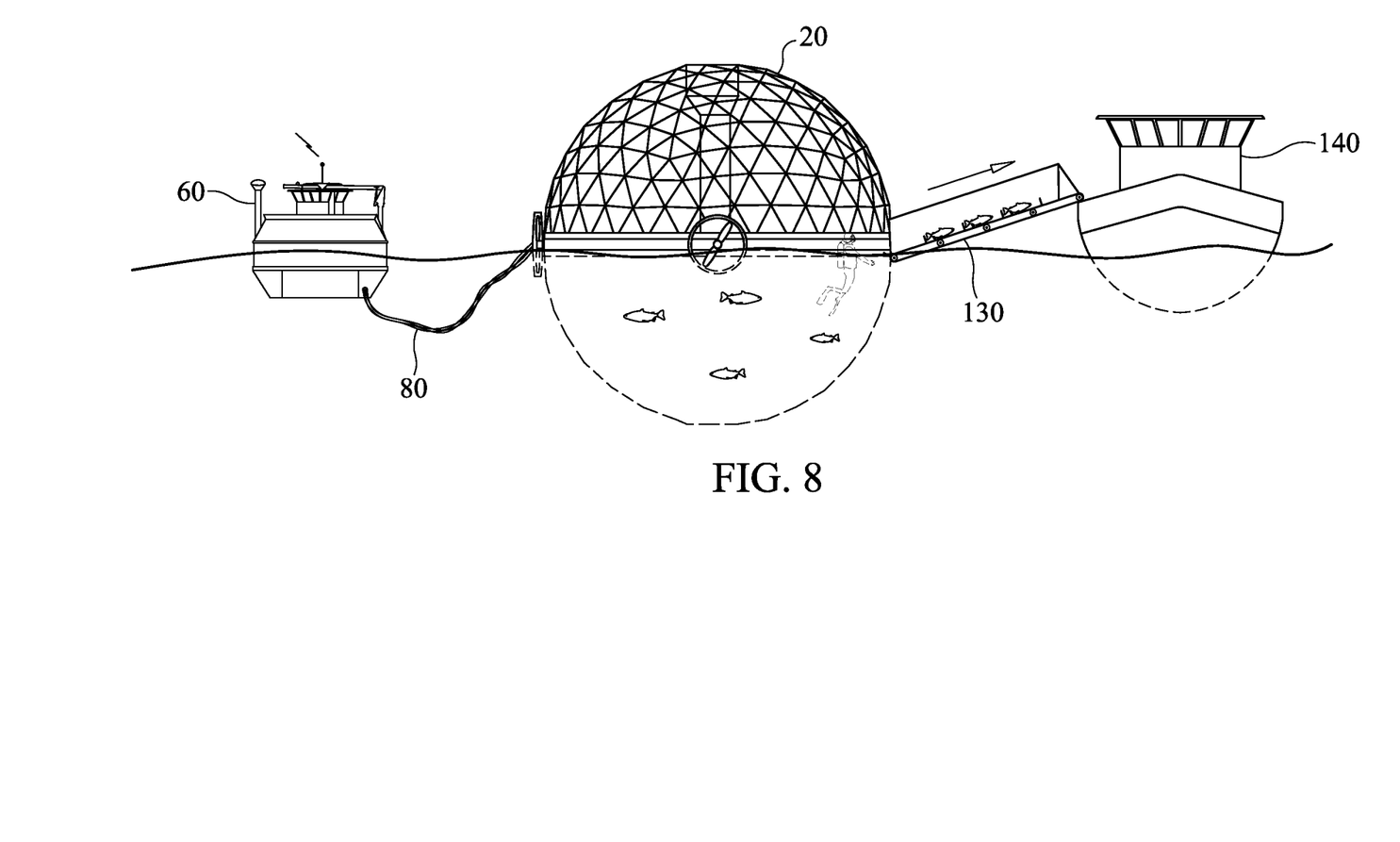
FIG. 8 illustrates the method of harvesting mature fish from enclosure 20 using conveyor system 130 to transport the fish to harvest vessel 140.

The process of harvesting mature fish from cage enclosure 20 is illustrated in FIG. 8. Cage enclosure 20 is brought to the surface by pumping compressed air into enclosure 20's onboard buoyancy control means. In the case of the embodiment shown in FIG. 8, compressed air is pumped from topside buoy 60 through tether assembly 80 and compressed air hose 90 into inflatable collar 34. Once enclosure 20 is surfaced, a conveyer system 130 is positioned to span the distance between the near side of enclosure 20 and a harvest vessel 140. A side section of enclosure 20 is opened to receive conveyor system 130. Mature fish are placed on trays having raised edges that comprise the belt of conveyor system 130, preventing the fish from sliding back down the belt of system 130 when system 130 is activated. System 130 transports the harvest fish from enclosure 20 to harvest vessel 140 where the fish are stored refrigerated and transported to port for distribution and consumption.

Summary and Scope

For ongoing fish-growing operation, structure 10 will have the onboard food storage and dispenser facilities as described previously. For fin fish such as tuna, the dispenser can dispense pelletized feed made from fish, algal and/or soybean proteins supplemented with Omega 3 & 6. The automated feed bin will be on board and pressurized with dry air. A computer will control the feeding times and monitor the amount of feed. Tender ship 120, described above, will visit the aquaculture site and dispense tuna feed to structures 10 at periodic intervals.

Feed intervals and aliquots are determined by the number and size of the fish occupying enclosure 20 as well as the rate of food consumption. According to a preferred embodiment, a Lidar radar sensor system will be used in conjunction with enclosure 20 to assess fish size and growth rates for purposes of adjusting feed dispersion intervals and aliquot size, and video monitoring will be used to determine whether the feed is being adequately taken up by the fish within the cage population.

Structures 10 may include water quality monitoring devices for determining the effectiveness of flushing by currents of effluent and fish waste.

Mortalities can be removed from enclosure 20 using a remote controlled unmanned underwater vehicle, or alternatively, by a suction pump mounted at the bottom of cage 20.

Harvesting and maintenance of structures 10 will be conducted at sea from surface vessels such as tender ship 120.

Although the system of the current invention has been described and illustrated in terms of growing a single marine species with a given enclosure 20, the structures 10 of the disclosed invention may also be used to create a polytrophic environment for growing two or more marine species. Lobsters, for example, may be introduced into a fin fish environment serving the purpose of cleaning the cage environment by consuming accumulated waste and build up of organic matter from biofouling. Or, as mentioned above, the netting on the underside of enclosure 20 can have enlarged stitching allowing egress to squid who would then serve as a supplemental food source for the farmed marine resource.

Structures 10 will be constructed of bio-fouling resistant materials such as Spectraline and Dyneema fiber, although other anti-biofouling materials may also be used with good results expected. By submerging cage enclosures 20, they will not be in direct sunlight most of the time due to the attenuation of light through water, and this will slow the bio-fouling process. A robotic net cleaner may be used to remove bio-fouling from the netting of the cage enclosures.

Cage enclosures 20 will submerge to be shielded from winds, storms, piracy and collision with ships, much like a stationary submarine and can operate in deep waters away from the coast and have the ability to self position, thereby maintaining valuable coastline views. Structures 10 are designed to be positioned and maintained in deep water within miles from the coast, giving the onboard power plants access to cool and cold water while maintaining a high degree of monitoring over planned open ocean aquaculture operations.

The dynamic positioning of open ocean structure 10 allows for full freedom of motion and removes the need for any mooring systems, tethers, or anchors. The submersible structure can operate well off shore to minimize the visual impact on the coast, and maximize the number of units that can be deployed. It is self-positioning by employing GPS, computer automated and controllable via radio telemetry. The open ocean aquaculture cage enclosures 20 provide for scalability of production in oligotrophic waters to allow for the complete aerobic decomposition of excess feed and metabolites. Near-shore tuna pens and tethered cages pose a hazard to the costal environment due to effluent accumulation and large scale production of tuna may not be environmental viable. Aquaculture farms operating in deep water in the open ocean allow large scale production while providing adequate mixing and complete aerobic decomposition of farm effluent. The open-ocean structures of the present invention are continuously flushed by natural ocean currents, ensuring the fish will experience less disease and parasites compared with near shore ocean fish farming.

The structures of the present invention comprise a unique fish farming environment and system particularly in that they are un-tethered. Un-tethered systems include the advantage over anchored fish farms in having the ability to move out of harms way in the case of an oil spill or some other type of pollution. Also, in jurisdictions that require ocean farm lease sites be fallowed for a period of time, usually one year, the fish farming system of the present invention can be moved to another location rather than being left unproductive for a year.

The need for an open ocean aquaculture system is driven by the world demand for seafood and declining catches from natural fisheries. The proliferation of open ocean aquaculture systems would mitigate the fishing of natural populations and promote a rebound of marine wildlife.

The topside solar fed water cooled heat engine and/or hybrid power plant provides integrated heat/power generation and also possible hydrogen generation. The invention enables extended open ocean operations and the ability to harvest the unlimited potential of ocean resources.

It is understood that many modifications and variations may be devised given the above description of the principles of the invention. It is intended that all such modifications and variations be considered as within the spirit and scope of this invention, as defined in the following claims.

The invention claimed is:

1. A system for growing aquatic resources to be maintained in an approximate geostationary position including relative to the water surface comprising:
   a plurality of autonomous submersible structures each such structure further comprising:
   (a) a cage for growing aquatic resources within a cage volume contained therein;
   (b) a topside buoy tethered to said cage enclosure by at least one main tether;
   (c) a remote controlled dynamic positioning system capable of maintaining the structure in an approximate geostationary position on or at a given depth below the water surface;
   (d) a buoyancy control system coupled to the remote controlled dynamic positioning system; and
   (e) a cage propulsion system coupled to the remote controlled dynamic positioning system configured to propel the aquatic structure within the ocean environment;
   wherein said remote controlled dynamic positioning system of each structure of the system communicates with the buoyancy control system and the cage propulsion system of said same structure to position said structure within the ocean environment and to maintain said structure in an approximate geostationary position on or at a given depth below the water surface; and
   wherein each said structure of the system has a further communication system for communicating its position relative to the positions of at least one other aquatic structure of said system in order to maintain each such submersible structure in a group pattern relative to the other submersible structures in approximate correspondence with a target geostationary position on or at a given depth below the water surface.

2. The system of claim 1, further comprising a tender boat that remains in the general vicinity of said structures, communicates with said structures, supplies said structures with fish feed.

3. The system of claim 1, further comprising robotic underwater devices to clean said cage enclosures and remove debris and fatalities from said enclosures.

4. The system of claim 1, further comprising a conveyor belt system that attached to said cage enclosure when said cage enclosure is surfaced and used to harvest the aquatic resource grown in the cage volume.

5. A system for growing aquatic animal resources to be maintained in an approximate geostationary position comprising:
   a plurality of autonomous submersible aquatic structures each such structure further comprising:
   (a) a submersible cage enclosure for growing aquatic animal resource within a cage volume contained therein;
   (b) a topside buoy tethered to said cage enclosure by at least one main tether, and wherein said topside buoy comprises a topside propulsion means;
   (c) a remote controlled onboard dynamic positioning system capable of maintaining the aquatic structure in an approximate geostationary position;
   (d) an onboard buoyancy control system coupled to the remote controlled onboard dynamic positioning system;
   (e) an onboard propulsion system coupled to the remote controlled onboard dynamic positioning system configured to propel the aquatic structure within the aquatic environment;
   wherein said remote controlled onboard dynamic positioning system communicates with the onboard buoyancy control system and the onboard propulsion system to position said structure within the aquatic environment and to maintain said structure in an approximate geostationary position and the cage enclosure at a given depth relative to the water surface, and
   wherein each of said structure of the system further has a communication system for communicating its position relative to the positions of at least one other aquatic structure of said system in order to maintain each such submersible structure in a group pattern relative to the other submersible structures in approximate correspondence with a target geostationary position.

6. The system of claim 5 further comprising a tender boat that remains in the general vicinity of said structures, communicates with said structures, supplies said structures with fish feed.

7. The system of claim 5 further comprising robotic underwater devices to clean said cage enclosures and remove debris and fatalities from said enclosures.

8. The system of claim 5 further comprising a conveyor belt system that attached to said cage enclosure when said cage enclosure is surfaced and used to harvest the aquatic resource grown in the cage volume.

* * * * *